United States Patent [19]

Russell et al.

[11] 4,195,010

[45] Mar. 25, 1980

[54] CERAMIC COATED QUARTZ PARTICLES

[75] Inventors: Alexander H. Russell, Owings Mills; John L. McClinton, Hanover, both of Md.

[73] Assignee: Burns & Russell Company of Baltimore City, Baltimore, Md.

[21] Appl. No.: 813,359

[22] Filed: Jul. 6, 1977

[51] Int. Cl.² .......................... C08K 3/34; C08K 9/02; C08K 9/06
[52] U.S. Cl. ................................ 260/40 R; 428/428; 428/447; 428/454; 428/480
[58] Field of Search ............. 260/40 R; 428/428, 447, 428/454, 480

[56] References Cited

U.S. PATENT DOCUMENTS 3,328,231  6/1967  Sergovic .............................. 428/78

OTHER PUBLICATIONS

Modern Plastics Encyclopedia 1967, Sep. 1966, vol. 44, No. 1A, pp. 416, 417 & 457.

*Primary Examiner*—James H. Derrington
*Attorney, Agent, or Firm*—Cushman, Darby & Cushman

[57] ABSTRACT

Resinous coatings of an ethylenically-unsaturated polyester are employed to form masonry blocks and tiles which exhibit resistance to fading and loss of color consistency in exterior applications. Ceramic coated quartz granules and sand particles precoated with an unsaturated organofunctional silane provide depth and softness of color and texture which when combined with a polymerizable polyester resin produce decorative fade resistant articles that also exhibit resistance to staining and moisture. The sand, granule and polyester compositions of the invention can also be formed as cast articles without masonry unit backing.

16 Claims, 2 Drawing Figures

CERAMIC COATED QUARTZ PARTICLES

BACKGROUND OF THE INVENTION

1. Field of the Invention

This invention relates to coated masonry building units, coating compositions, therefor, and coated masonry building units composed of ceramic coated quartz particles which when combined with polymerizable polyester resins provide cast articles which exhibit resistance to fading, staining and pigmentation degradation in exterior applications.

2. Description of the Prior Art

It has been recognized in the prior art that ceramic coated mineral particles may be employed to provide pigmentation and color in various resinous coatings and compositions. In Lea, U.S. Pat. No. 3,562,076, translucent or transparent base rock having a pigmented ceramic coating was employed for flooring compositions with colored decorative inserts which when subjected to wear remain color stable. Ceramic coated materials such as quartz, quartzite or igneous rock have been coated with ceramic materials and employed in coating compositions employing fused hydroplastic clay (Jewitt, U.S. Pat. No. 2,379,358) or combined with pigments to provide various roofing materials (Buzzell, U.S. Pat. No. 2,614,051).

Various organic polymeric resins have been employed as binders for ceramic coated particles for tile compositions such as, for example, Lea, U.S. Pat. No. 3,562,076, which as discussed, prevented discoloration resulting from abrasion.

The basic patent on the use of polyester as coatings for masonry units is Sergovic U.S. Pat. No. 2,751,775.

In Sergovic, U.S. Pat. No. 3,328,231, a coated masonry building block was made of a cured composition of an unsaturated polyester resin and sand in which the sand comprises at least 50% by weight of the coating composition. The unsaturated polyester resin is derived from a reaction between a dicarboxylic acid, e.g., phthalic, maleic, fumaric, adipic, pimelic, suberic, itaconic, citraconic, succinic acids, hydrides and polyhydric alcohol, e.g., ethylene glycol, diethylene glycol and propylene glycol. There is also present an unsaturated monomer such as methyl methacrylate, styrene, diallyl phthalate, t-butyl styrene, alpha-methyl styrene. In Sergovic, U.S. Pat. No. 4,031,289, coated masonry building blocks and articles and compositions therefor were provided which employed various pigments in combination with various resinous compositions to provide stain resistance to discoloration (blushing) when subjected to high moisture conditions for long periods. The entire disclosure of Sergovic U.S. Pat. Nos. 4,031,289; 3,328,231 and 2,751,775, are hereby incorporated by reference and relied upon.

Such pigmented surfaces while highly impervious to moisture have in the case of some pigments faded and discolored in environmental conditions involving repeated and protracted periods of exposure to bright sunlight. The problems of color losses are particularly apparent in exterior applications of tile where sharp contrasts exist between shaded and exposed areas of tiles. Consequently, it is an object of the present invention to provide a building composition which may be employed in the external applications subjected to protracted and sharp contrasts of sunlight and shade and withstand not only the dirt and water generally encountered under such environmental conditions but at the same time retain its color consistency and vitality under such conditions. Likewise, the present invention is of benefit in both interior and exterior applications, since it provides a coating with a translucent three dimensional coloring system that offers a completely different appearance and range of colors than is possible using the prior art.

SUMMARY OF THE INVENTION

Coated masonry building units and monolithic cast objects and coatings of the present invention exhibit a resistance to color changes and discoloration since the color producing particles are ceramic coated quartz particles which are impervious to fading and discoloration and are resistant to water and moisture when coated with an unsaturated organo functional silane and combined in a unsaturated polymerizable polyester resin. Cast articles formed in accordance with the invention provide building unit surfaces that not only withstand discoloration but also provide resistance to mechanical damages. changes and stains and the formation of voids during formulation.

In the course of research leading to the present invention, it was discovered that a pretreatment of the sand particles and granules with an unsaturated organo functional silane was necessary to provide resistance against moisture, oils and stains while assuring the necessary resistance to color changes and fading occasioned by exterior applications of the cast articles of the present invention. It was further discovered that once the sand particles and pigment carrying granules were coated with an unsaturated organo functional silane and combined with an unsaturated polymerizable polyester resin, the resulting coatings and coated articles had surfaces that maintained a resistance to moisture, crazing and cracking and color uniformity. Furthermore, since the present invention does not employ separate pigments which are not resistant to ultraviolet light in the composition it will be recognized that the ceramic coated color containing granules maintain their resistance to color changes and provides an aesthetically pleasing surface texture and soft three dimensional color in a translucent resin medium.

Suitable unsaturated polymerizable polyester resins which may be used as coating compositions for masonry building units are obtained from reacting a dicarboxylic acid with a polyhydric alcohol in a manner that is familiar to resin chemists. Thus there can be used any of the unsaturated polymerizable polyester resins of the above mentioned Sergovic U.S. Pat. Nos. 4,031,289; 2,751,775 and 3,328,231. Preferred resinous compositions have a polyester made from a glycol component consisting of neopentyl glycol or a mixture of neopentyl glycol, with up to 42 molar percent based on the total glycol of a glycol selected from a group consisting of propylene glycol, ethylene glycol and diethylene glycol and a dicarboxylic acid component consisting of isophthalic acid and maleic anhydride, the maleic anhydride being 10 to 33 percent of the total polyester resin by weight. There is also included either styrene and/or methyl methacrylate. The preferred unsaturated polymerizable polyester resin formulation employed in the present invention consist of isophthalic acid, maleic anhydride and neopentyl glycol or a propylene glycol resin which is high in isophthalic acid content which polyester is present together with the polymerizable monomers styrene and methyl methacrylate.

Those polyester resins which can be used are ethylenically unsaturated alkyl resins. Among the dicarboxylic acids which may be used are phthalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol, propylene glycol and neopentyl glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produce an allyl ester of the dicarboxylic acid.

The mole ratio of total alcohol to total acid is approximately the theoretical one of 1:1. Preferably, a slight excess of glycol, e.g., a 2% molar excess, is employed.

As is conventional in making unsaturated polyesters, they are cut with polymerizable solvents in an amount sufficient to make the uncured composition liquid when applied to the masonry unit. There can be employed, for example, 30 to 45%, or even up to 55%, of the polymerizable solvent. The preferred polymerizable solvents as indicated are styrene, methyl methacrylate and mixtures thereof. However, there can be used other polymerizable solvents such as those mentioned in prior U.S. Pat. Nos. 2,751,775 and 3,328,231, e.g., p-methyl styrene, vinyl acetate, diallyl phthalate, cyclopentadiene, ethyl acrylate.

The precoating of the ceramic coated quartz particles and sand particles is achieved through employing an ethylenically-unsaturated organofunctional silane, e.g., those set forth in the aforementioned Sergovic U.S. Pat. Nos. 4,031,289 and 3,328,231. Thus there can be used silanes or siloxanes having the general formula:

$$R_xSiX_{(4-x)}$$

in which at least one R is an unsaturated group, preferably an unsaturated hydrocarbon group, e.g., an alkenyl, haloalkenyl or alkadienyl group, including dienyl, vinyl, chlorvinyl, bivinyl, allyl, methallyl, chlorallyl, and the like; X is a group which reacts with the hydroxyl groups present in sand or moisture normally present in the surface of sand such as, preferably, chlorine or bromine, although it may be oxyaryl, oxyalkyl, amino, etc.; x is a whole number from 1 to 3. If more than one R group is present, the remaining R groups can be hydrocarbyl, e.g., alkyl, such as methyl or ethyl or aryl, e.g., phenyl. Examples of these compounds are:
allyl triethoxy silane
diallyl diethoxy silane
triallyl ethoxy silane
methallyl trichloro silane
trichloroallyl chloro silane
allylphenyl dichloro silane
allylethyl dichloro silane
allylmethyl diethoxy silane
diallylmethyl ethoxy silane
allyl trichloro silane
dimethallyl diethoxy silane
vinyl trichloro silane
divinyl dichloro silane
trivinyl monochloro silane
vinyl triethoxy silane
methyl vinyl dichloro silane These organofunctional silanes are preferably selected from the group consisting of vinyltriethoxysilane, vinyltris(2-methoxyethoxy)silane and gamma-methacryloxypropyltrimethoxy silane. In accordance with the present invention sand particles or silica having a Tyler screen size of from about 4 mesh to 200 mesh and color containing ceramic granules having a Tyler screen size from about 4 mesh to 200 mesh are treated with about 0.001 percent to about 1.25 percent by weight with the unsaturated organofunctional silane. The sand particles and granules may be treated separately or mixed prior to treatment. The preferred treatment of the sand particles and granules is with about 0.5 percent by weight with vinyl-tris(2-methoxyethoxy)silane.

Typically the preferred filler for compositions of the present invention are composed in the range of from about 15% to 80% of the ceramic granules by weight to the 85% to 20% of the silica or sand which has been treated with the organo functional silane. There can be used 100% of the ceramic granules. The preferred amount is about 56% ceramic granules to 44% sand and even more desirably 25% ceramic granules to 75% silica. The sand particles and ceramic granules are generally over 50% and preferably comprise 70% to 90% by weight of the total resinous composition, i.e., resin plus filler.

The color containing ceramic coated particles and coated sand particles are selected in such a manner as to impart the desired color appearance and texture to the cast article or coating composition. It will be recognized that a wide variety of colors and textures may be achieved by mixing various ceramic colored granules with various sand compositions. In the descriptions of the invention the words granules or ceramic coated particles refer to ceramic coated inorganic particles, preferably quartz occurring naturally in a rounded or spherical shape.

The preferred resin composition including the polymerizable solvent and catalyst is shown below in Table 1.

TABLE 1

| Component A - Resin Formulation A | | |
|---|---|---|
| Isophthalic Maleic Neopentyl glycol | | 800 grams |
| Vinyl Benzene | | 100 grams |
| Methyl Methacrylate | | 320 grams |
| Tri-ethyl Phosphate | | 150 grams |
| Bentone - 38 of National Lead, Inc. | | 7.5 grams |
| A-benzotriazole - | Sold under the tradename Cyasorb - 5411 American Cyanamid | 2.7 grams |
| Dow Corning Anti-Foam A - | A modified methyl silicone fluid | 2 grams |
| Alumina trihydrate (Al$_2$O$_3$ .3H$_2$O) | | 50 grams |
| Catalyst Component B | | |
| Peroxyester 2,5-dimethyl 2,5-bix (2-ethyl hexanoylperoxy) hexane liquid | | 12.5 grams |

It will be recognized by those skilled in the art that the resin component A may be modified by the omission or substitution by other materials and various components such as, the tri-ethyl phosphate which is a compound employed in the resin composition to impart flame retardancy to the polyester composition. Alternatively various chlorinated paraffin compounds may be substituted to impart flame retardancy. to the composition. Similarly in certain applications the Bentone 38 which is a rheological additive that is an organic derivative of magnesium montmorillonite sold by National Lead, Inc., may be deleted or other additives substituted in the composition. In a similar manner, the A-benzotriazole may be substituted with other UV agents or may be omitted where UV resistance is not particularly important. It will be further recognized by those skilled in the art that the anti-foaming compound and the alumina trihydrate ($Al_2O_3 \cdot H_2O$) may similarly be deleted or other compounds substituted in their place.

Conventional free radical catalysts, e.g., peroxygen compounds can be employed as curing agents for the unsaturated polyester resin, e.g., benzoyl peroxide, methyl ethyl ketone peroxide, t-butyl, perbenzoate, t-butyl peroctoate, and 2,5-dimethyl-2,5-bis(2-ethylhexanoylperoxy)hexane (available as U.S. Peroxygen Catalyst 245). The amount of catalyst is not critical and as is conventional is usually between 0.5 and 2% of the total weight of the unsaturated polyester and polymerizable solvent. In the preferred embodiment 12.5 grams of U.S. Peroxygen Catalyst 245 will cure the resinous compositions in about 20 minutes at about 370° F. plate temperature.

The cast articles of the present invention including the coated masonry units and blocks are particularly suited for exterior purposes such as the exterior walls of buildings and structures which are constantly exposed to sunlight and ultraviolet light which would otherwise degrade the pigmentation of tiles and other articles.

BRIEF DESCRIPTION OF THE DRAWINGS

The invention and its various aspects will be more fully described when taken in conjunction with the accompanying drawings in which.

Figure 1:
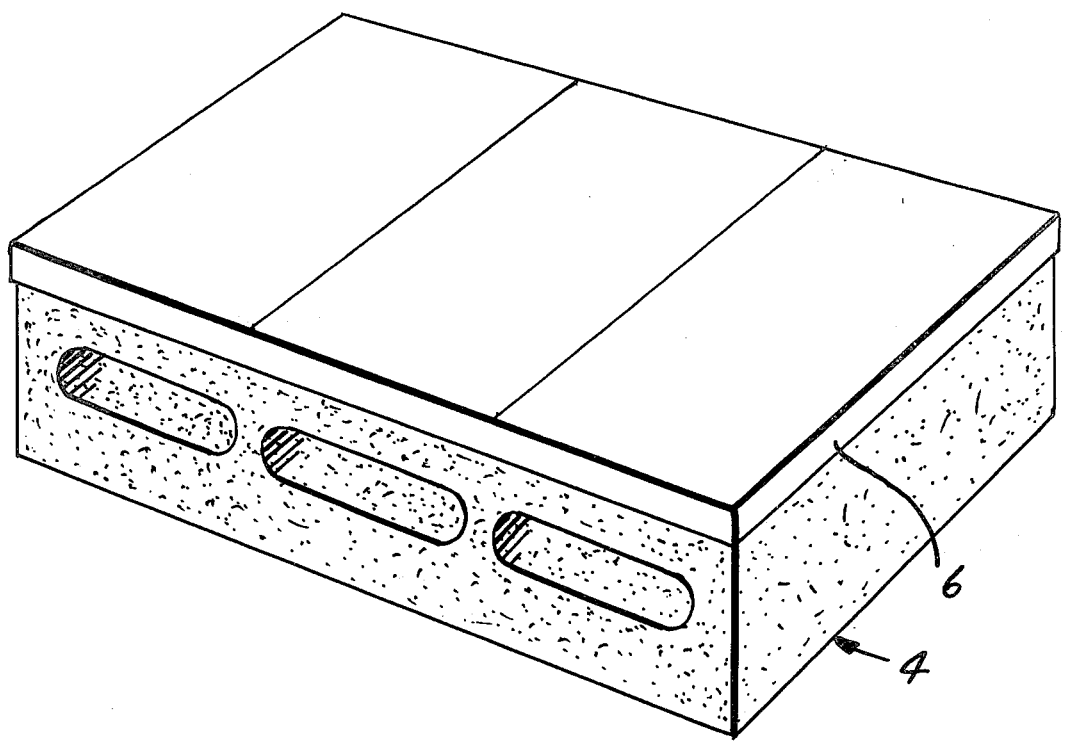
FIG. 1 is a perspective view of a coating and base building block illustrating the application of preferred embodiment of the invention.

Referring in particular to FIG. 1, a masonry block 4 is depicted having a cured ethylenically-unsaturated polyester resin coating 6 including color containing ceramic coated granules (FIG. 2) and sand particles (FIG. 2) which impart color and texture to the masonry block 4.

Figure 2:
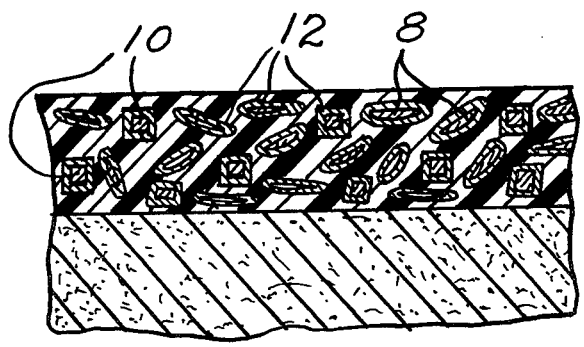
FIG. 2 is a fragmentary vertical section view of a coated block employing sand and granules exhibiting the pigmentation areas and texture of coated articles in accordance with the invention.

In FIG. 2, the fragmentary vertical sectional view of masonry block 4 illustrates the color containing ceramic coated granules 8 and sand particles 10. FIG. 2 additionally depicts the unsaturated organofunctional silane coating 12 on both the granules and sand particles. FIG. 2 also depicts coated granules 8 in a rounded configuration which is the preferred configuration of particles employed in the present invention. It has been discovered that granules having rounded edges perform better in achieving the advantages of the present invention in maintaining the articles resistance to stains and resistance to sunlight better than sub-angular particles or particles with irregular corners and edges.

DETAILED DESCRIPTION

In order to describe in greater detail the preferred embodiments and applications of the present invention specific examples are hereinafter set forth in which all parts and percentages are by weight unless otherwise indicated.

Typically coatings and coated articles are fabricated by employing five basic components:

(A) A polyester component (B) A catalyst component (C) A sand or silica component (D) Color containing ceramic granules which impart a color to the composition, and (E) An unsaturated organofunctional silane employed to coat the sand or silica component (C) and the color containing granules component (D) prior to this incorporation in the resinous composition as will be illustrated by the following examples.

EXAMPLE 1

A warm granite colored cast article was prepared by treating each of the following types of ceramic granules with 0.05 percent by weight with vinyl-tris(2-methoxyethoxy)silane[$CH_2=CHSi(OCH_2CH_2OCH_3)_3$];

(a) buff colored ceramic coated granules particle size AFS #33 where 26% is retained on 48 Tyler screen, and (b) brown colored ceramic granules particle size AFS #33 where 26% is retained on 48 Tyler screen.

A surface-treated sand mixture was then prepared by treating each of the following types of sand particles with 0.05 percent by weight with vinyl-tris(2-methoxyethoxy)silane[$CH_2=CHSi(OCH_2CH_2OCH_3)_3$];

(a) sand particle size AFS #33 where 26% is retained on 48 Tyler screen, and (b) sand particle size AFS #73 where 24% is retained on 200 Tyler screen.

The warm granite colored coating composition was then prepared by mixing the following proportions of the sand particles and granules which have been coated as described above in the following proportions:

| Sand Component | |
|---|---|
| (a) Sand particle AFS #33 where 26% is retained on 48 Tyler screen | 900 grams |
| (b) Sand particle size AFS #73 where 24% is retained on 200 Tyler screen | 420 grams |
| Coated Ceramic Granule Component | |
| (a) Granules-buff colored ceramic particle size AFS #33 where 26% is retained on 48 Tyler screen | 1330 grams |
| (b) Granules-brown colored ceramic particle size AFS #33 where 26% is retained on 48 Tyler screen | 670 grams |

The sand and ceramic granule components are added to the polyester resin component containing the following compounds:

| Compounds | Quantities |
|---|---|
| Resin composed of neopentyl glycol, isophthalic acid and maleic anhydride | 800 grams |
| Vinyl benzene | 100 grams |
| Methyl methacrylate | 320 grams |
| Triethyl phosphate | 150 grams |
| Bentone 38 rheological additive | 7.5 grams |
| A-benzotriazole (UV absorbent) | 2.7 grams |
| Dow Anti-Foam A (a silicone anti-forming agent) | 2 grams |
| Alumina trihydrate | 50 grams |

To this sand, ceramic granule and resin mixture was added the:

| Catalyst Component | Quantities |
|---|---|
| Peroxyester 2,5-dimethyl 2,5-bis | |

| Catalyst Component | Quantities |
|---|---|
| (2-ethyl hexanoylperoxy)hexane | 12.5 grams |

After thorough mixing, the resinous coating composition was cured by placing the composition in a mold and heating the mixture for about 20 minutes at about 370° F. oven temperature.

EXAMPLE 2

In this example a nutmeg colored cast article was prepared by employing resin component compounds in the proportions as set forth in Example 1. Variation of color was obtained by changing the proportions and types of sand particles and ceramic granules. The following sand particles and ceramic granules were precoated with 0.05% by weight with vinyl-tris(2-methoxyethoxy)silane:

| | Sand Component | Quantities |
|---|---|---|
| (a) | Sand particle size AFS #33 where 26% is retained on 48 Tyler screen | 900 grams |
| (b) | Sand particle size AFS #73 where 24% is retained on 200 Tyler screen | 1420 grams |
| | Granule Component | Quantities |
| (a) | Granules - White ceramic colored particle size AFS #33 where 26% is retained on 48 Tyler screen | 800 grams |
| (b) | Granules - Red ceramic colored particle size AFS #33 where 26% is retained on 48 Tyler screen | 100 grams |
| (c) | Granules - Buff ceramic colored particle size AFS #33 where 26% is retained on 48 Tyler screen | 100 grams |

After thorough mixing, the composition was placed in a mold and placed in a curing oven at a temperature of 370° F. for 20 minutes to cure the resinous coated article. The curing caused the nutmeg colored resinous coated article to become firmly anchored to a substrate and the coating was found to have had a smooth, decorative facing having resistance to staining, discoloration and moisture resistance in addition to a color fast resistance making the coating suitable for exterior applications.

In the following examples the stain resistance of coatings of the present invention including comparison tests were run using ink and oil stains. The ink employed in the staining tests is Waterman's Permanent Blue Black Ink and the oil stain was prepared in accordance with Section 4.4.2.8.1 of Federal Specification SS-C-621b. The cured coated surfaces in the tests are exposed for 24 hours for ink and 96 hours for the oil type stain.

The stain resistance evaluation in the following examples is determined by rating the finishes after staining by observing the sample under uniform fluorescent light condition at a distance of 1.5 feet, in which the following symbols in Table 1 represent the evaluation criteria used.

TABLE II

| Symbol | Meaning |
|---|---|
| VG | very good resistance; does not stain |
| G | Good resistance; difficult to detect the stain |
| P | poor resistance; stain is clearly detectable |
| VP | very poor resistance; stain is very bad |
| VVP | very, very poor; stain is very bad, very dark and very large |

EXAMPLE 3

In this example, coated articles were prepared in accordance with Example 1 using angular granules first and then repeated using rounded granules with the cast articles having the warm granite color. The sand particles and ceramic granules were treated with an organo functional silane. The stain results for the two combinations using sand and the two different shapes of ceramic granules were as follows:

| | Using Angular Granules | Using Rounded Granules |
|---|---|---|
| ink resistance | VG | VG |
| oil resistance | VG | VG |

EXAMPLE 4 (comparison example)

Coated articles were prepared similar to Example 1 in which the sand particles were treated with the organofunctional silane and the ceramic granules were not treated. The stain results for the sand and granules were as follows:

| | Using Angular Granules | Using Rounded Granules |
|---|---|---|
| ink resistance | VG | VG |
| oil resistance | VP | VG |

EXAMPLE 5 (comparison example)

In this example a coated article was prepared similar to Example 1. Neither the sand nor rounded ceramic granules were treated with the organo functional silane and the results of the stain tests were as follows:

| | Using Angular Granules | Using Rounded Granules |
|---|---|---|
| ink resistance | VVP | VP |
| oil resistance | VP | VP |

Sun exposure test results and weather tests on tiles formulated in accordance with the present invention confirm the superiority of the use of such cast articles for exterior applications.

While the invention has been described with respect to the nutmeg and warm granite colored cast articles it will be appreciated that the invention can be implemented in a number of different ways by those skilled in the art to suit particular requirements as to texture, appearance and design. For example, colored cast articles may be prepared using ceramic granules only and omitting the sand component. The present invention may also be used as coatings and as cast resins without being applied to masonry units. It will be understood that theses and various other changes and substitutions

What is claimed is:

1. In a decorative fade resistant cast article suitable for exterior applications comprised of a cured resinous composition of an ethylenically unsaturated polyester resin, an ethylenically unsaturated polymerizable solvent and filler particles comprising color containing inorganic ceramic coated granules or a mixture of such ceramic granules and sand particles, wherein the improvement comprises imparting a fade resistant and three-dimensional color in a translucent resin medium to impart color to the cast article by selecting and combining filler particles wherein said filler particles comprise from about 15 percent to 100 percent by weight of said granules to 85 percent to 0 percent by weight of sand and wherein said filler particles employed to provide color to said cast article have a Tyler screen size of from about 4 mesh to 200 mesh wherein said filler particles are treated with an ethylenically unsaturated organo-functional silane in an amount sufficient to provide an environmental composition and prevent discoloration of the filler particles and resin medium of the cast article and thereafter adding said filler particles to said polymerizable polyester resin, and polymerizable solvent wherein said filler particles comprise at least 50 percent by weight of said resinous composition.

2. A decorative fade resistant cast article according to claim 1 wherein the ethylenically unsaturated polyester resin contains a polyester made from a glycol component selected from a group consisting of neopentyl glycol, propylene glycol and dimethylene glycol and a dicarboxylic acid component consisting of isophthalic acid and maleic anhydride.

3. A decorative fade resistant cast article according to claim 1 wherein the unsaturated organo-functional silane is at least one member selected from a group consisting essentially of vinyltriethoxysilane, vinyl-tris(2-methoxyethoxy)silane and gamma-methacryloxypropyltrimethoxysilane.

4. A decorative fade resistant cast article according to claim 1 wherein said filler particles are treated with about 0.001 to 1.25 percent by weight with said organo-functional silane.

5. A decorative fade resistant article of claim 1 wherein said sand and said ceramic granules are treated with about 0.05 percent by weight of said granules and said sand with vinyl-tris(2-methoxyethoxy)silane prior to adding said sand particles and ceramic granules to said polymerizable polyester resin, and polymerizable solvent.

6. A decorative fade resistant cast article of claim 1 wherein said treatment of said sand particles and said ceramic granules with said unsaturated organo-functional silane is accomplished by treatment of a mixture of sand particles and granules prior to adding said sand and ceramic granules to said polymerizable polyester resin, and polymerizable solvent.

7. A decorative fade resistant cast article according to claim 1 wherein the polymerizable solvent is selected from the group consisting of styrene and methyl methacrylate.

8. A decorative fade resistant article according to claim 1 additionally comprising a flame retardant.

9. A decorative fade resistant cast article according to claim 1 additionally comprising A-benzotriazole as an ultraviolet screening agent.

10. A decorative fade resistant cast article according to claim 1 wherein said ceramic granules are of a rounded shape.

11. A decorative fade resistant cast article according to claim 1 wherein the proportions of sand particles to ceramic granules is in the range of about 20 to 95 percent by weight.

12. A decorative fade resistant cast article according to claim 1 wherein about 75 percent by weight sand to about 25 percent by weight ceramic granules is added to said polymerizable polyester resin and polymerizable solvent.

13. A decorative fade resistant cast article according to claim 1 wherein said sand particles and ceramic granules comprise from about 70 to 90 percent by weight of said resinous composition.

14. In a decorative fade resistant masonry article suitable for exterior applications having a facing comprised of a cured resionous composition of ethylenically unsaturated polyester resin, filler particles comprising color containing inorganic ceramic coated UV resistant granules or a mixture of said ceramic granules and sand particles wherein said filler particles comprise from about 15 percent to 80 percent by weight of said ceramic granules to about 85 percent to 20 percent by weight of said sand and wherein said filler particles for providing color to said cast article have a Tyler screen size of from about 4 mesh to 200 mesh and impregnating said polyester resin with said filler to produce a three-dimensional fade resistant color in a translucent resin medium for the masonry article by treatment of said filler with about 0.001 to 1.25 percent by weight of the total of said filler with an ethylenically unsaturated organo-functional silane and thereafter adding said filler particles to said polymerizable polyester resin and polymerizable solvent wherein said filler comprises at least 50 percent by weight of said resinous composition.

15. A decorative fade resistant article according to claim 14 wherein the ethylenically unsaturated polyester contains a polyester made from a glycol component selected from a group consisting of neopentyl glycol, proplyene glycol and dimethylene glycol and a dicarboxylic acid component consisting of isophthalic acid and maleic anhydride.

16. A decorative fade resistant article according to claim 14 wherein the unsaturated organo-functional silane is at least one member selected from a group consisting essentially of vinyltriethoxysilane, vinyl-tris(2-methoxyethoxy)silane and gamma-methacryloxypropyltrimethoxysilane.

* * * * *